Figure 1:
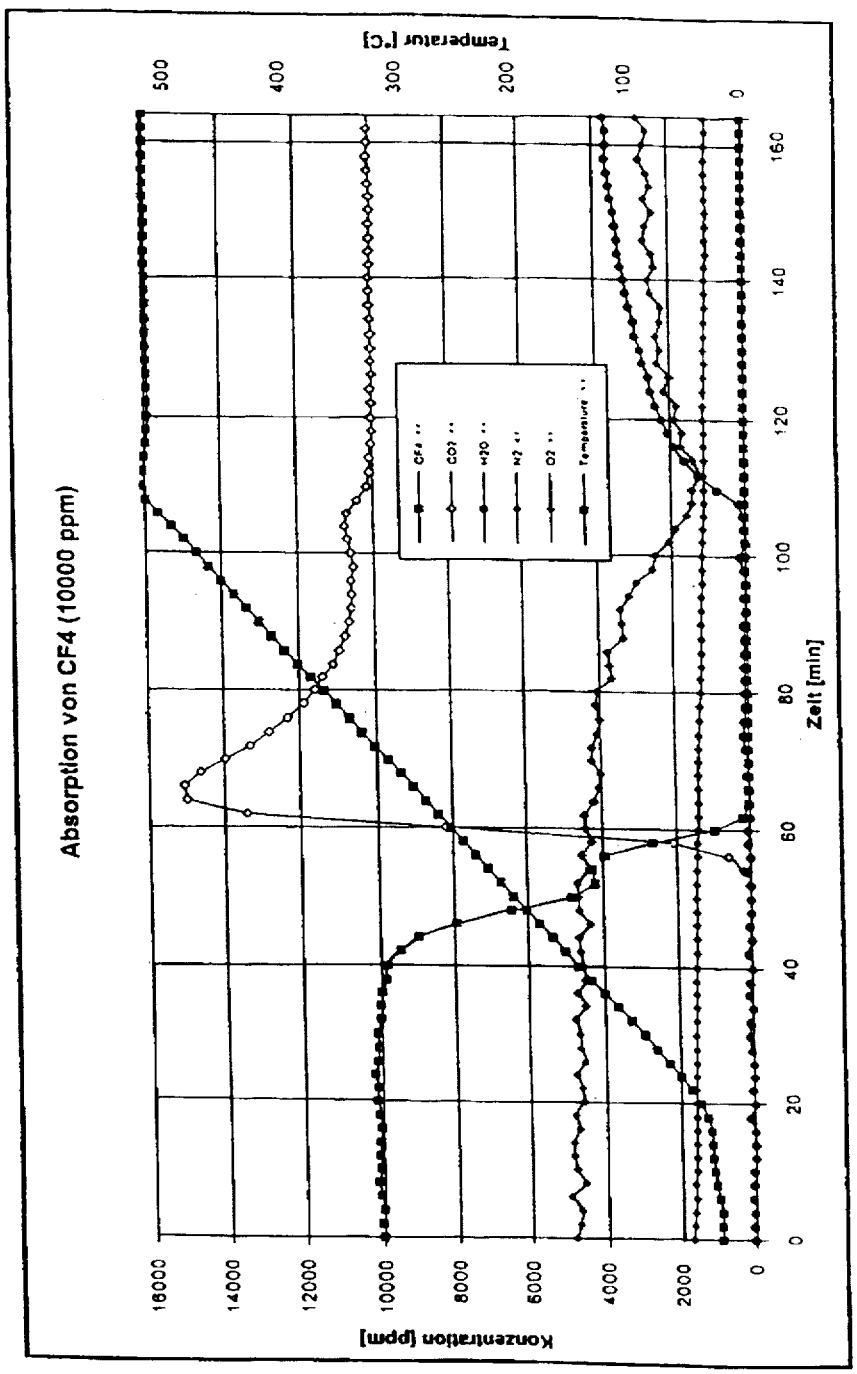

United States Patent [19]
Scholz et al.

[11] Patent Number: 6,110,436
[45] Date of Patent: Aug. 29, 2000

[54] PROCESS FOR REMOVING OZONE-DEPLETING AND/OR CLIMATE-ACTIVE FLUORINATED COMPOUNDS FROM A GAS STREAM AND APPLICATION OF THE PROCESS

[76] Inventors: Christoph Scholz, Riedern 55, D-83666 Waakirchen; Walter Holzinger, Lindenallee 14, D-82041 Deisenhofen; Karl Markert, Rosenheimerstr. 10; Eckard Kopatzki, Am Ganter Nr. 4, both of D-85635 Hoehenkirchen-Siegertsbrunn, all of Germany

[21] Appl. No.: 09/214,081

[22] PCT Filed: Jun. 24, 1997

[86] PCT No.: PCT/EP97/03318

§ 371 Date: Dec. 23, 1998

§ 102(e) Date: Dec. 23, 1998

[87] PCT Pub. No.: WO97/49479

PCT Pub. Date: Dec. 31, 1997

[30] Foreign Application Priority Data

Jun. 26, 1996 [DE] Germany .......................... 196 25 607
May 12, 1997 [DE] Germany .......................... 197 19 834

[51] Int. Cl.$^7$ .......................... B01D 53/00; B01D 53/68
[52] U.S. Cl. .................. 423/240 S; 423/220; 588/206; 588/248; 205/391
[58] Field of Search .................. 423/240 S, 220; 588/206, 248; 205/391

[56] References Cited

U.S. PATENT DOCUMENTS 3,876,394  4/1975  Nix ................................................ 55/71
5,015,343  5/1991  LaCamera et al. ........................ 204/67
5,885,539  3/1999  Bjarnoet et al. ..................... 423/240 S

FOREIGN PATENT DOCUMENTS

| 583 194 | 9/1959 | Canada ................................... 205/391 |
| 0 412 456 A2 | 2/1991 | European Pat. Off. ............... 588/206 |
| 41 02 969C1 | 10/1992 | Germany . |
| 44 04 329C2 | 8/1995 | Germany . |
| 195 32 279C2 | 3/1997 | Germany . |

OTHER PUBLICATIONS

"Long–Lived and Greenhouse Gases in the Semiconductor Industry: A Review of Science, Policy, and Technology" by Michael T. Mocella, submitted Feb. 1994 for publication in the Journal of Semiconductor Safety Association (8 pages).

*Primary Examiner*—Tom Dunn
*Assistant Examiner*—Timothy C Vanoy
*Attorney, Agent, or Firm*—Flynn, Thiel, Boutell & Tanis, P.C.

[57] ABSTRACT

A process is provided for removing fluorinated compounds, such as perfluorinated or partially fluorinated C1 to C4 hydrocarbons, $NF_3$ and $SF_6$, out of a gas by passing this gas through gamma alumina, wherein the temperature of the gamma alumina is between ambient temperature and 600° C. The gas stream and the gamma alumina are anhydrous. The fluorinated compounds chemically react with the gamma alumina to result in a gas containing a diminished quantity of fluorinated compounds and an aluminum fluoride containing composition.

13 Claims, No Drawings

PROCESS FOR REMOVING OZONE-DEPLETING AND/OR CLIMATE-ACTIVE FLUORINATED COMPOUNDS FROM A GAS STREAM AND APPLICATION OF THE PROCESS

This invention relates to a process for removing fluorinated ozone-depleting and/or climate-active fluorinated compounds from a gas stream which is passed through a solid heated sorbent. It also relates to applications of this process.

Fluorocarbons, both perfluorinated ones and partly fluorinated ones (HFCs), and chlorofluorocarbons (CFCs and HCFCs) have been used on a large scale for decades as propellants, refrigerants, blowing and parting agents, solvents, cleaning agents, etc.

However, they have a high ODP (ozone depletion potential) and are therefore held mainly responsible for the depletion of the ozone layer in the atmosphere. Due to their infrared absorption spectrum and their sometimes extremely long atmospheric lifetime they further have a high GWP (greenhouse warming potential), i.e. they make an essential contribution to global warming. Reference is made to the following table:

Atmospheric lifetime and greenhouse warming potential (GWP) of fluorocarbons and hydrofluorocarbons and other gases

| Substance | Lifetime (Years) | GWP (Integrated over 100 years) |
|---|---|---|
| $CO_2$ (reference) | 100 | 1 |
| $CF_4$ | 50000 | 6300 |
| $C_2F_6$ | 10000 | 12500 |
| $SF_6$ | 3200 | 24900 |
| $NF_3$ | 180 | 9720 |
| $CHF_3$ | 250 | 12100 |
| $CH_2F_2$ | 6 | 485 |
| $C_2HF_5$ | 36 | 2740 |
| $C_2H_2F_4$ | 18 | 1330 |

(cf. Michael T. Mocella, DuPont Fluoroproducts "Long-Lived and Greenhouse Gases in the Semiconductor Industry: A Review of Science, Policy, and Technology" Journal of the Semiconductor Safety Association, Vol. 8, No. 4, page 13, December 1994, and "Radiative Forcing of Climate Change", published in Climate Change—The IPCC Scientific Assessment, edited by J. T. Houghton, G. J. Jenkins, and J. J. Ephraums, Cambridge University Press, Cambridge, November 1994.)

DE 44 04 329 C1 discloses a process according to the preamble of claim 1. The sorbent used is a phyllosilicate containing iron oxide. The known process has proven to be successful by and large, but the sorbent must be heated to a relatively high temperature, for example up to 350° C. for sorption of $CF_4$. The sorption capacity of the sorbent also leaves something to be desired.

It is known from EP 0 412 456 A2 to decompose fluorocarbons with water vapor at 350 to 1000° C. on an alumina catalyst into hydrogen chloride, hydrogen fluoride, carbon dioxide and carbon monoxide as well as other compounds such as trifluoroacetyl chloride. However, the removal and disposal of these partly very aggressive and toxic decomposition products involves considerable expense.

The problem of the invention is to remove fluorinated compounds from a gas stream at a low expense.

This is achieved according to the invention by the process characterized in claim 1. Claims 2 to 5 render advantageous embodiments of the inventive process. Claims 6 to 14 relate to preferred applications of the inventive process.

According to the invention the gas stream containing the fluorinated compounds is passed through a sorbent of γ-(gamma)-alumina. The gas stream and the γ-alumina must be anhydrous. Surprisingly, this causes the fluorine contained in the very inert, ozone-depleting and/or climate-active fluorinated compound to be bound quantitatively to the γ-alumina sorbent, and at a rather moderate temperature of e.g. 200 to 400° C. If the fluorinated compound is a chlorofluorocarbon, quantitative bonding of the chlorine to the sorbent together with the fluorine is similarly to be ascertained.

According to the inventive process, substantially all ozone-depleting and/or climate-active fluorinated compounds can thus be adsorbed.

These include in particular perfluorinated or partly fluorinated (HFC) saturated or unsaturated hydrocarbons with 1 to 4 carbon atoms in the molecule, fluorinated hydrocarbons halogenated with other halogen atoms besides fluorine, in particular chlorine, i.e. perhalogenated (CFC) and partly halogenated (HCFC), saturated and unsaturated chlorofluorocarbons with 1 to 4 carbon atoms per molecule, in particular, trichlorofluoromethane, dichlorodifluoromethane, bromochlorodifluoromethane, dibromodifluoromethane, chlorotrifluoromethane, bromotrifluoromethane, tetrafluoromethane, dichlorofluoromethane, chlorodifluoromethane, trifluoromethane (fluoroform), difluoromethane (methylene fluoride), 1,1,2,2-tetrachlorodifluoroethane, 1,1,2-trichlorotrifluoroethane, 1,2-dichlorotetrafluoroethane, 1,2-dibromotetrafluoroethane, chloropentafluoroethane, hexafluoroethane, 1,2-dibromo-1,1-difluoroethane, 2-chloro-1,1,1-trifluoroethane, 2-chloro-1,1,1-trifluoroethane, 1-chloro-1,1-difluoroethane, 1,1,1-trifluoroethane, 1,1-difluoroethane, octafluoropropane, octafluorocyclobutane, decafluorobutane, 1,1-dichlorodifluoroethylene, chlorotrifluoroethylene (trifluorovinyl chloride), 1-chloro-2,2-difluoroethylene, and 1,1-difluoroethylene (vinylidene fluoride).

In this connection it should be mentioned that perfluorinated hydrocarbons are also referred to as fluorocarbons, and partly fluorinated ones as hydrofluorocarbons.

The inventive process is suitable in particular for removing tetrafluoromethane ($CF_4$) and hexafluoroethane ($C_2F_6$) which have high inertnesses, as reflected in their atmospheric lifetime.

The inventive process can also be used for eliminating nitrogen trifluoride ($NF_3$) and sulfur hexafluoride ($SF_6$).

In the inventive process the fluorine in the fluorinated compound is reacted quantitatively with the γ-alumina sorbent. The reaction takes place with tetrafluoromethane, for example, according to the following reaction equation:

$$3CF_4 + 2Al_2O_3 \rightarrow 4AlF_3 + 3CO_2$$

i.e. $CO_2$ evolves as a fission product but its GWP, as indicated by the above table, is several orders of magnitude lower than that of the tetrafluoromethane to be eliminated, so that the $CO_2$ released in the inventive process is negligible with respect to the GWP.

Similarly, the fluorine is bound quantitatively and irreversibly to the sorbent in the removal of nitrogen trifluoride and sulfur hexafluoride by the inventive process.

As tests have shown, the content of fluorinated compounds is reduced by at least 99%, in particular 99.9%, even that of the especially inert $CF_4$, when passing through the γ-alumina sorbent according to the inventive process.

The fluorinated compound can be supplied to the sorbent with a carrier gas. The carrier gas used can be an inert gas such as nitrogen or a noble gas.

However, the carrier gas can also be another gas such as air or oxygen. In particular when a fluorocarbon with more than one carbon atom per molecule is to be reacted, oxygen is supplied. For example, the reaction of hexafluoroethane takes place according to the following reaction equation:

$$2C_2F_6 + 2Al_2O_3 + O_2 \rightarrow 4AlF_3 + 4CO_2$$

In order to attain a quantitative conversion into $CO_2$ and suppress the production of CO, one uses 2 to 20 moles of oxygen per C atom in the molecule. The addition of oxygen or air at the same time essentially reduces the reaction temperature.

The carrier gas should be anhydrous. That is, it can be a manufactured gas, optionally ambient air also. In any case one must make sure that the carrier gas absorbs no further moisture. If the gas to be cleaned contains traces of water the latter are preferably removed with a molecular sieve before the gas is supplied to the γ-alumina sorbent. The gas to be cleaned preferably contains less than 1000 ppm of water, in particular, less than 100 ppm. In any case, the amount of fluorine of the fluorinated compound which is sorbed on the γ-alumina is greater the drier the carrier gas is. The alumina is kept in a sufficiently dry state by being heated to clearly above 100° C. during sorption.

The γ-alumina preferably has a purity of more than 99.0%. One preferably uses a γ-alumina with a BET surface of more than 50 $m^2/g$, in particular, more than 200 $m^2/g$, and a pore volume of more than 0.2 $cm^3/g$. The mean pore diameter can be e.g. 2–50 nm, in particular 5–15 nm. A large-specific surface area of the γ-alumina is necessary because the fluorine of the fluorinated compound is primarily bound to the surface of the γ-alumina as aluminum fluoride.

The alumina can be used in a pure form or in combination with other substances. For example, one can use mixtures of zeolites and alumina and/or aluminum hydroxide. However, the amount of alumina and/or aluminum hydroxide in the sorbent should be at least 10 wt %, preferably at least 30 wt %.

The alumina or aluminum hydroxide can be doped with metals of groups Ia, IIa, IVa, Ib, IIb, IVb, VIb, VIIb and VIIIb. The sorbent can also contain oxides and other compounds of these metals.

The sorbent can be a fixed bed or fluid bed. The sorbent can be heated to a temperature up to 1000° C. However, the inventive process is preferably performed with a temperature of the sorbent between ambient temperature and 600° C. The temperature of the sorbent depends on the fluorinated compound to be absorbed. For example, tetrafluoromethane is already absorbed by the inventive process at about 150° C., and hexafluoroethane at about 180° C. The temperature of the sorbent is generally between 250 and 450° C.

The inventive process is preferably performed at atmospheric pressure. However, it can also be performed at a reduced pressure or at a pressure of, for example, up to 20 bars.

The space velocity can be, for example, 10 to 1000 $h^{-1}$ (total volumetric flow 1/h/catalyst volume 1), which corresponds to a dwell time of 0.1 to 0.001 h. The space velocity is preferably between 50 and 500 $h^{-1}$ or the dwell time between 0.02 and 0.002 h. As mentioned, the fluorinated compound is preferably supplied in a carrier gas, whereby the concentration of fluorinated compound in the carrier gas can greatly fluctuate, for example, between 0.001 to 20 vol %.

The inventive process can be used for disposing of ozone-depleting and/or climate-active fluorinated compounds. It is estimated that more than 2 million tons of fluorinated hydrocarbons are in circulation at present worldwide in insulating foams, cooling equipment and in the form of bunkered supplies. In the inventive process the fluorinated compounds to be disposed of are bound quantitatively and irreversibly by the solid sorbent. That is, one obtains no ozone-depleting or climate-active decomposition or reaction products, apart from a negligibly small amount of carbon dioxide. Even when the sorbent is saturated no such decomposition or reaction products are released. When the sorbent is saturated, the discharged fluorinated compound can be bound with the sorbent, for example with the following fixed bed, i.e., for example, a further container filled with a solid sorbent according to DE 41 02 969 C1.

The inventive process can be performed with a reactor of any size which normally only needs to be heatable. It can thus readily also be performed in a discontinuous and decentralized fashion, e.g. in municipal waste disposal.

In the semiconductor industry large quantities of perfluorinated compounds, also called PFCs (perfluorinated compounds), are used for dry etching. These include in particular carbon tetrafluoride ($CF_4$), trifluoromethane ($CHF_3$), hexafluoroethane ($C_2F_6$) and sulfur hexafluoride ($SF_6$) and nitrogen trifluoride ($NF_3$). From these compounds, fluorine is formed, for example, by electrical discharge, and used to etch the semiconductor substrate, for example, a silicon wafer. These perfluorinated compounds are extremely inert. They are therefore not caught by the waste-gas cleaning installations used in the semiconductor industry and are thus released into the atmosphere. The invention is therefore, in particular, also applicable for waste-gas cleaning installations in the semiconductor industry.

An apparatus especially suitable for cleaning waste gases containing ozone-depleting and/or climate-active fluorinated compounds has a sorption device with two chambers each containing a solid stationary inventive sorbent for the ozone-depleting and/or climate-active fluorinated compounds and communicating with each other via a heating device. For reversing the direction of flow of the waste gas to be cleaned, the two chambers are adapted to be connected alternately with the gas supply for the waste gas to be cleaned. This apparatus is described in German patent application 195 32 279.7.

The following steps are performed:
a) the sorbent in one of the two chambers is heated at least partly to a temperature necessary for decomposing the ozone-depleting and/or climate-active fluorinated compounds,
b) the waste gas to be cleaned is supplied, with the heating device switched on, to a first chamber heated to this temperature and cleaned therein,
c) the cleaned waste gas discharged from the first chamber flows, after being heated in the heating device, into the second chamber until the sorbent thereof has reached, at least partly, the temperature necessary for decomposing the ozone-depleting and/or climate-active fluorinated compounds,
d) the waste gas to be cleaned is supplied to the second chamber and then cleaned,
e) the cleaned waste gas discharged from the second chamber flows, after being heated in the heating device, into the first chamber until the sorbent thereof has reached, at least partly, the temperature necessary for decomposing the ozone-depleting and/or climate-active fluorinated compounds,
f) steps (b) to (e) are repeated.

Step (a) is performed by supplying an inert carrier gas to the second chamber with the heating device switched on.

A further important application of the inventive process is to remove perfluorinated hydrocarbons which are formed in aluminum production by electrolysis of alumina in molten cryolite with carbon electrodes.

The fusion electrolysis is performed in tubs whose side walls and bottoms have a carbon lining serving as a cathode, for example a coal-tar mixture. The anodes used are carbon blocks hanging on a supporting frame connected with the positive current of the current source into the molten cryolite, i.e. $Na_3[AlF_6]$ or $3NaF.AlF_3$, in which about 15 to 20 wt % alumina is dissolved at a bath temperature of around 950° C.

In fusion electrolysis part of the cryolite is reacted with the carbon electrodes. This leads firstly to cryolite consumption in the melt and secondly to the formation of fluorocarbons, in particular tetrafluoromethane and hexafluoroethane. Accordingly, aluminum production by electrolysis of alumina in molten cryolite with carbon electrodes is responsible for over 90% of the worldwide tetrafluoromethane emissions.

According to the inventive process, the fluorocarbon discharged from the cryolite/alumina melt can be bound to the alumina and/or aluminum hydroxide sorbent.

The fusion electrolysis is performed in a closed tub or similar vessel provided with at least one gas outlet for the fluorocarbon formed in the melt and passed through the alumina and/or aluminum hydroxide sorbent which is heated to a temperature sufficient for absorbing the fluorocarbon.

One can optionally also pass an air or other gas stream over the melt by, for example, connecting a fan to the outlet of the vessel containing the sorbent to suck air or another gas over the melt.

This not only prevents the fluorocarbons formed in the aluminum production from passing into the atmosphere, but, at the same time, forms from the alumina or aluminum hydroxide aluminum fluoride, i.e. $AlF_3$, the component of the cryolite which is consumed in the fusion electrolysis.

The alumina and/or aluminum hydroxide sorbent converted with the fluorocarbon into aluminum fluoride can then be added to the cryolite/alumina melt in order to replace cryolite consumed in the electrolysis.

With gases obtained cryogenically, i.e. by air liquefaction and subsequent fractional distillation of the liquid air, these trace impurities accumulate to a greater or lesser degree in the particular gas. Especially, high amounts of impurities of these fluorinated compounds naturally occur in those cryogenically obtained gases which, on the one hand, occur only in very low quantity in air and must thus be accordingly enriched and which, on the other hand, cannot, or not readily, be separated by fractional distillation from fluorinated compounds contained in especially high concentrations in air. This applies in particular to noble gases, mainly krypton and xenon, which occur only in a quantity of about $1 \times 10^{-4}$ or $8 \times 10^{-6}$ vol % in air and, on the other hand, are difficult to separate by fractional distillation, for example, from $CF_4$ and $SF_6$ contained in a considerable quantity in air.

While effective measures, such as molecular sieves, socalled metal getters and the like, are available for removing other trace impurities, such as carbon dioxide, carbon monoxide, hydrocarbons, water vapor, oxygen, nitrogen and the like, from a gas to be cleaned, the removal of these fluorinated compounds from a gas to be cleaned involves considerable difficulties since these compounds accumulating in the atmosphere are naturally extremely inert. This likewise applies to the afterpurification of other superpure gases not produced cryogenically.

The inventive process now also makes it possible to effectively clean gases containing fluorinated compounds as trace impurities.

The inventive process is thus suitable in particular for cleaning gases obtained cryogenically from air, i.e. by air liquefaction and fractional distillation of the liquid air. These include, in particular, the noble gases, i.e. helium, neon, argon, krypton and xenon, but also oxygen and nitrogen.

These gases can thus be obtained according to the invention as superpure gases whose content of fluorinated compounds is less than 10 ppm, preferably less than 1 ppm or even less than 0.1 ppm.

The inventive process can be used to afterpurify superpure gases having a purity of at least 99.9% (=quality class 3.0). This at the same time permits an increase in quality classes. For example, argon and helium are currently available commercially only in the maximum quality class 7.0, krypton with at most about 4.5 and neon with at most about 4.0. The inventive process permits the maximum available quality class of noble gases to be essentially increased. The same applies to the afterpurification of other superpure gases such as oxygen or nitrogen, and to superpure gases not obtained by air separation but nevertheless containing small quantities of fluorinated compounds as a foreign gas share.

The inventive process can be used, e.g., for obtaining krypton and xenon in a cryogenic air separator, krypton and xenon being enriched into a krypton and xenon concentrate and krypton and/or xenon being obtained from the krypton-xenon concentrate by means of distillation. Then the krypton-xenon concentrate or the krypton or xenon is cleaned in a solid sorbent of γ-alumina whereby the fluorinated impurities, in particular fluorocarbons such as $CF_4$ and/or $SF_6$, are removed from the krypton-xenon concentrate or krypton or xenon.

If the fluorinated compounds to be removed from the superpure gas consist of fluorinated or partly fluorinated hydrocarbons, $CO_2$ arises as a gaseous decomposition product during sorption of the perfluorinated or partly fluorinated hydrocarbons on the γ-alumina sorbent. The thus-formed $CO_2$ can be removed from the gas to be cleaned by the following $CO_2$ sorbent, for example, a molecular sieve, in particular, a zeolite. With perfluorinated compounds having more than one C atom, CO can also evolve, and with $SF_6$ e.g. $SO_2$, which can each be removed in the same way.

The following examples will serve to explain the invention further.

EXAMPLE 1

A heatable fixed-bed microreactor was filled with γ-alumina (purity >99.6 wt %) with traces of $SiO_2$, $Na_2O$ and $TiO_2$ (altogether <0.4 wt %), a BET surface of 250–255 $m^2/g$, a pore volume of 0.70–0.90 $m^3/g$ and a mean pore diameter of 8–9 nm.

Tetrafluoromethane ($CF_4$) was supplied to the microreactor at a concentration of 1 vol % in helium as a carrier gas. The space velocity was 158 $h^{-1}$ and, total mass flow 35 sccm (standard cubic centimeters). The sorbent was heated from ambient temperature to 520° C. The gas composition was examined with a gas chromatograph with a molecular sieve (MS04) and a Poraplot Q-column (PQ08).

The enclosed FIG. 1 shows the absorption of $CF_4$. One can see that absorption began at approximately 140° C. and took place quantitatively at approximately 290° C.

EXAMPLE 2

Example 1 was repeated except that hexafluoroethane ($C_2F_6$) was supplied to the microreactor instead of $CF_4$. As the enclosed FIG. 2 indicates, the absorption of $C_2F_6$ began at approximately 180° C. and was quantitative as of 480° C.

What is claimed is:

1. In a process for removing fluorinated compounds comprising perfluorinated or partially fluorinated saturated or unsaturated hydrocarbon having from 1 to 4 carbon atoms in the molecule from a gas stream comprising the step of passing the gas stream through a solid sorbent, the improvement comprising the solid sorbent comprises γ-alumina, the solid sorbent and the gas stream containing the fluorinated hydrocarbon are anhydrous and the fluorine in the fluorinated hydrocarbon binds quantitatively to the solid sorbent and forms aluminum fluoride.

2. The process of claim 1, wherein the sorbent consists of a mixture of γ-alumina and a zeolite.

3. The process of claim 1, wherein the γ-alumina has a purity of at least 99.0 wt. %.

4. The process of claim 1, wherein the sorbent is heated to a temperature of at most 600° C.

5. The process of claim 1, wherein oxygen is supplied to the sorbent if the hydrocarbon has more than one carbon atom per molecule.

6. The process of claim 1, wherein it is used to remove fluorocarbons from gases formed in aluminum production by electrolysis of alumina in molten cryolite with carbon electrodes.

7. The process of claim 6, wherein after reacting with the fluorocarbons, the sorbent is added to the cryolite/alumina melt.

8. The process of claim 1, wherein the gas stream contains up to 20% fluorinated compounds.

9. The process of claim 1, wherein the gas stream is a gas obtained cryogenically from air.

10. The process of claim 1, wherein the gas stream is a superpure gas with a purity of at least 99.9 wt. %.

11. The process of claim 1, wherein the gas stream is a noble gas or noble gas mixture, oxygen, nitrogen, hydrogen, carbon monoxide or carbon dioxide.

12. The process of claim 1, wherein the content of fluorinated compounds in the gas stream to be cleaned is up to 100 ppm.

13. The process of claim 1, wherein the fluorinated compounds consist of fluorinated hydrocarbons and carbon dioxide evolving from the γy-alumina's reaction with the fluorinated hydrocarbons is removed from the gas stream by a carbon dioxide sorbent.

* * * * *

UNITED STATES PATENT AND TRADEMARK OFFICE
CERTIFICATE OF CORRECTION

PATENT NO. : 6,110,436
DATED : August 29, 2000
INVENTOR(S) : Christoph Scholz et al.

Page 1 of 3

Figure 2:
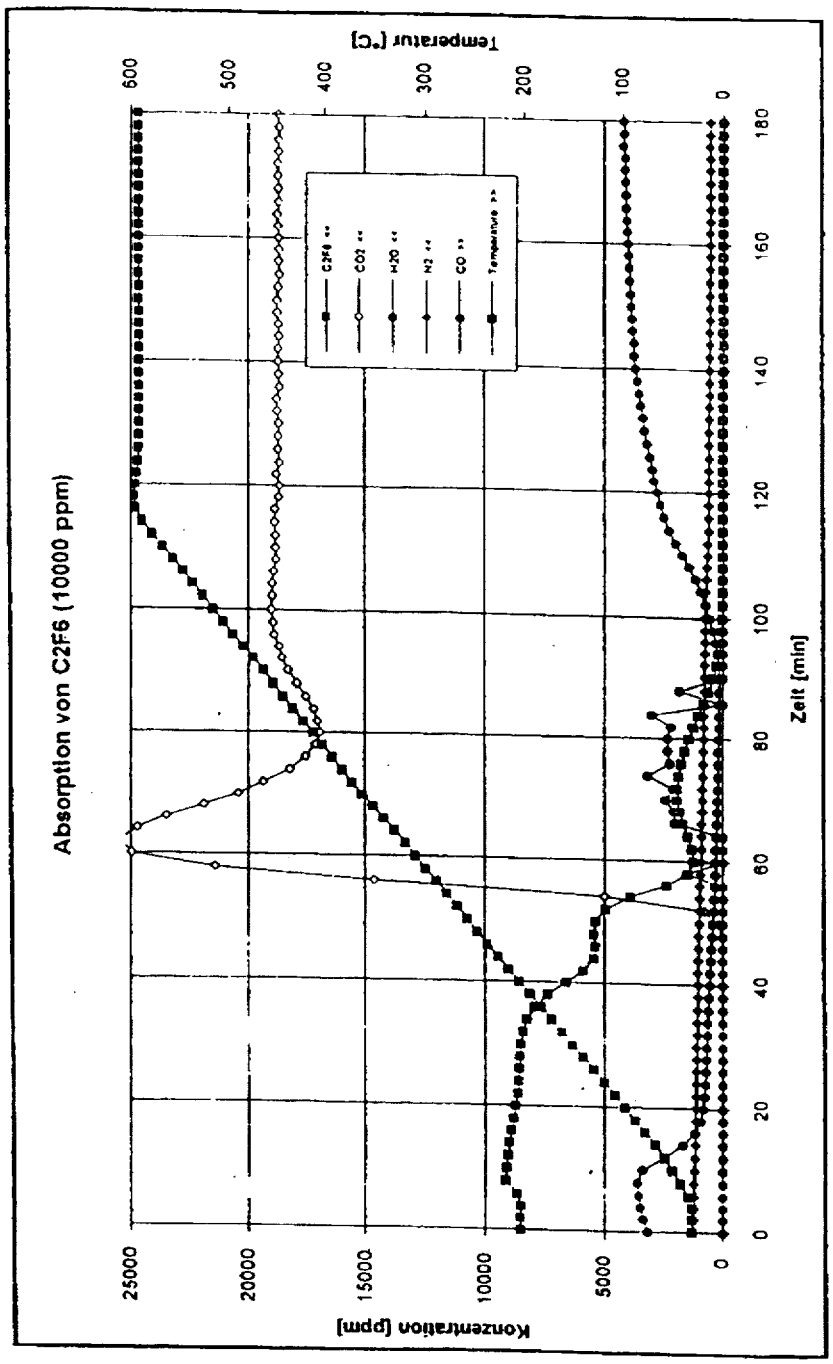

It is certified that error appears in the above-identified patent and that said Letters Patent is hereby corrected as shown below:

Drawings,
Add the Drawing Sheets, 1 and 2, consisting of Figs. 1 and 2, as shown on the attached pages.

Column 8,
Line 18, change "γγ-alumina's" to -- γ-alumina"s --.

Signed and Sealed this

Eighteenth Day of December, 2001

Attest:

JAMES E. ROGAN
*Attesting Officer*    *Director of the United States Patent and Trademark Office*